US012219603B2

(12) United States Patent
Miao et al.

(10) Patent No.: US 12,219,603 B2
(45) Date of Patent: Feb. 4, 2025

(54) METHOD AND DEVICE FOR TRANSMITTING DATA AND INDICATING DATA TRANSMISSION

(71) Applicant: DATANG MOBILE COMMUNICATIONS EQUIPMENT CO., LTD., Beijing (CN)

(72) Inventors: Jinhua Miao, Beijing (CN); Bertrand Pierre, Beijing (CN); Yali Zhao, Beijing (CN); Li Chen, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 223 days.

(21) Appl. No.: 17/422,038

(22) PCT Filed: Dec. 25, 2019

(86) PCT No.: PCT/CN2019/128430
§ 371 (c)(1),
(2) Date: Jul. 9, 2021

(87) PCT Pub. No.: WO2020/143454
PCT Pub. Date: Jul. 16, 2020

(65) Prior Publication Data
US 2022/0104262 A1 Mar. 31, 2022

(30) Foreign Application Priority Data

Jan. 11, 2019 (CN) .......................... 201910028831.2

(51) Int. Cl.
*H04W 74/0808* (2024.01)
(52) U.S. Cl.
CPC .............................. *H04W 74/0825* (2013.01)
(58) Field of Classification Search
None
See application file for complete search history.

(56) References Cited

U.S. PATENT DOCUMENTS

2018/0220277 A1 8/2018 Senarath et al.
2018/0317123 A1\* 11/2018 Chen ..................... H04W 72/21
(Continued)

FOREIGN PATENT DOCUMENTS

CN 105191441 A 12/2015
CN 108668364 A 10/2018
(Continued)

OTHER PUBLICATIONS

International Search Report issued by the International Searching Authority (ISA/CN) in PCT Application No. PCT/CN2019/128430 on Mar. 24, 2020. 6 pages, including English translation.
(Continued)

*Primary Examiner* — Saumit Shah
(74) *Attorney, Agent, or Firm* — Meunier Carlin & Curfman LLC

(57) ABSTRACT

Disclosed are a method and device for transmitting data and indicating data transmission, relating to the technical field of wireless communications and used for solving the problem in the prior art of a terminal device being unable to preferentially transmit data with special requirements of a resource, a time delay, etc., when data of different types is transmitted or received and a resource collision occurs. The present application comprises: receiving at least one priority threshold indicated by a network side and associated with a first channel, wherein the at least one priority threshold comprises a first priority threshold; and when the first channel overlaps with a second channel, determining, according to a first priority of the first channel and the first priority threshold, whether to transmit or obtain first data, wherein the first channel is used for transmitting or obtaining the first data, and the second channel is used for transmitting or obtaining second data.

16 Claims, 6 Drawing Sheets

(56) References Cited

U.S. PATENT DOCUMENTS

| | | | |
|---|---|---|---|
| 2019/0313419 A1* | 10/2019 | Fakoorian | H04L 5/0055 |
| 2020/0053801 A1* | 2/2020 | Hosseini | H04W 52/281 |
| 2020/0077470 A1* | 3/2020 | Xiong | H04L 1/1854 |
| 2020/0322943 A1* | 10/2020 | Shi | H04L 69/22 |
| 2020/0389910 A1 | 12/2020 | Li et al. | |
| 2021/0084644 A1* | 3/2021 | Bae | H04W 72/21 |
| 2021/0218511 A1* | 7/2021 | Zhang | H04L 5/0053 |

FOREIGN PATENT DOCUMENTS

| | | | |
|---|---|---|---|
| KR | 20180089816 A | 8/2018 | |
| WO | 2018174450 A1 | 9/2018 | |
| WO | 2019005920 A1 | 1/2019 | |

OTHER PUBLICATIONS

Huawei et al. "UCI enhancements for URLLC." 3GPP TSG RAN WGl Meeting #97. R1-1906058. Agenda Item 7.2.6.2. Reno, NV. May 13-17, 2019. Section 3. 10 pages.

Huawei et al. "UL intra-UE mutiplexing between control channel and data channel." 3GPP TSG RAN WGl Meeting #97. R1-1907548. Agenda Item 7.2.6.2. Reno, NV. May 13-17, 2019. Section 2. 3 pages.

QUALCOMM. "Dynamic priority for delay sensitive services." 3GPP TSG RAN WG2 Meeting ran2 #99bis. R2-1711711. Resubmission of R2-1708721. Agenda Item 10.3.1.7. Prague, Czech. Oct. 9-13, 2017. Sections 2-3. 3 pages.

\* cited by examiner

METHOD AND DEVICE FOR TRANSMITTING DATA AND INDICATING DATA TRANSMISSION

CROSS-REFERENCE OF RELATED APPLICATIONS

The present application is a National Stage of International Application No. PCT/CN2019/128430, filed Dec. 25, 2019, which claims priority from Chinese Patent Application No. 201910028831.2, filed with the China National Intellectual Property Administration on Jan. 11, 2019 and entitled "Methods and Devices for Data Transmission and Indicating Data Transmission", the entire content of which is hereby incorporated by reference.

FIELD

The present application relates to the field of wireless communication technology, and in particular to a method and device for data transmission and indicating data transmission.

BACKGROUND

In the next-generation New Radio (NR) system, the network side may pre-configure Uplink (UL) resources, to facilitate some services that require high latency (such as Ultra-Reliable and Low Latency Communications (URLLC) services) or services with relatively regular service formats (such as Voice over Internet Protocol (VoIP) services) to be transmitted on the pre-configure UL resources.

When a User Equipment (UE) transmits data, the UE needs to use the resources configured grant by the network side for the UE and use dynamic grant resources by the uplink Scheduling Request (SR) mechanism to the transmit data. And, the UE needs to send the URLLC data preferentially when using the above resources to send the data. However, when the UE uses the configured grant resources and the dynamic grant resources to send the data, the problem of increased delay in transmitting the URLLC data by the UE occurs in the following scenarios.

1) The collision of the configured grant resources and the dynamic grant resources causes the increased delay of the URLLC data.

As shown in FIG. 1, when the pre-configured grant resources overlap or collide with the dynamically grant and scheduled resources, the dynamic grant resources are preferentially used to transmit the dynamically scheduled data. But, the dynamic grant carries the Enhance Mobile Broadband (eMBB) data, that is, the data with low transmission delay requirement, while the pre-configured grant carries the URLLC data, that is, the data with high transmission delay requirement (which needs the very low transmission delay). At this time, the transmitting of dynamic grant data makes it impossible to send the pre-configured grant data, which leads to an increase in delay of the URLLC data of services with high transmission delay requirement.

2) The collision of the SR transmission resources and the uplink and downlink shared channel (such as Physical Uplink Shared CHannel (PUSCH)) resources causes a delay in sending the URLLC data.

Since the eMBB services or enhanced Machine Type of Communication (eMTC) services have the lower delay requirement, the network side will configure a longer PUSCH duration. The URLLC has the higher delay requirement, so the network side will configure a shorter PUSCH duration.

There is a situation in which the arrival of the data corresponding to the URLLC logical channel triggers the Buffer Status Report (BSR) but there is no UL grant at this time, so the SR corresponding to the URLLC logical channel will be triggered. After the SR is triggered, the UE is assigned a UL grant. At this time, the UE can send the BSR on the corresponding UL grant, i.e., PUSCH in FIG. 2. The UE will cancel the SR corresponding to the URLLC logical channel, and send a BSR carrying the amount of URLLC data on the UL grant.

However, the PUSCH at this time is allocated for non-URLLC services, so the processing delay of the network is longer, thereby leading to the problem of URLLC transmission delay.

3) The MAC CE multiplexing priority problem causes the URLLC data to be delayed.

As shown in FIG. 3, the priority of the BSR is higher than the priority of any data from logical channels, so the URLLC data will be delayed when the amount of data contained in the BSR is non-URLLC services and when the size of the sent UL grant is not enough to send the URLLC data.

4) Hybrid Automatic Repeat reQuest (HARQ) feedback causes the problem of increased delay of the URLLC data.

As shown in FIG. 4, when the HARQ feedback collides with the PUSCH resources or the PUSCH resources are not enough, the PUSCH data will be preferentially sent; but when the HARQ feedback is a feedback of the URLLC data, the increased delay of the URLLC data feedback will be caused and thus the URLLC transmission delay is increased.

To sum up, when the terminal device uses the configured grant resources and dynamic grant resources to transmit the data, there are many scenarios in which the problem of increased delay in transmitting the data with high reliability and low delay, that is, when the terminal device transmits or receives different types of data, the data with special requirements on resource or delay cannot be preferentially transmit in the event of resource collision.

SUMMARY

The present invention provides a method and device for data transmission and indicating data transmission, so as to solve the problem in the prior art that the data with special requirements on resource or delay cannot be preferentially transmit in the event of resource collision when the terminal device transmits or receives different types of data.

In a first aspect, a method for data transmission is provided, which is applied to a terminal device and includes:
 receiving at least one priority threshold, related to a first channel and indicated by a network, wherein the at least one priority threshold includes a first priority threshold; and
 when the first channel overlaps with a second channel, determining, according to a first priority of the first channel and the first priority threshold, whether to transmit or obtain first data;
 the first channel is used to transmit or obtain the first data; and
 the second channel is used to transmit or obtain second data.

In a second aspect, a method for indicating data transmission is provided, which is applied to the network and includes:

determining at least one priority threshold related to a first channel; and indicating the at least one priority threshold to a terminal device, so that when the first channel overlaps with a second channel, the terminal device determines, according to a first priority of the first channel and a first priority threshold among the at least one priority threshold, whether to transmit or obtain first data;

the first channel is used to transmit or obtain first data, and the second channel is used to transmit or obtain second data.

In a third aspect, a terminal device is provided, which includes a processor and a memory, the computer instructions, when executed by the processor, cause the processor to perform the process of the method described in any one of the first aspect described above.

In a fourth aspect, a network-side device is provided, which includes a processor and a memory, wherein the memory stores program codes, and the program codes, when executed by the processor, cause the processor to perform the process of the method described in any one of the second aspect described above when executing the program.

In a fifth aspect, the present application further provides a computer storage medium storing a computer program thereon, where the program implements the steps of the method described in the first or second aspect when executed by a processor.

BRIEF DESCRIPTION OF THE DRAWINGS

In order to illustrate the technical solutions in embodiments of the present application more clearly, the accompanying figures which need to be used in describing embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

Figure 1:
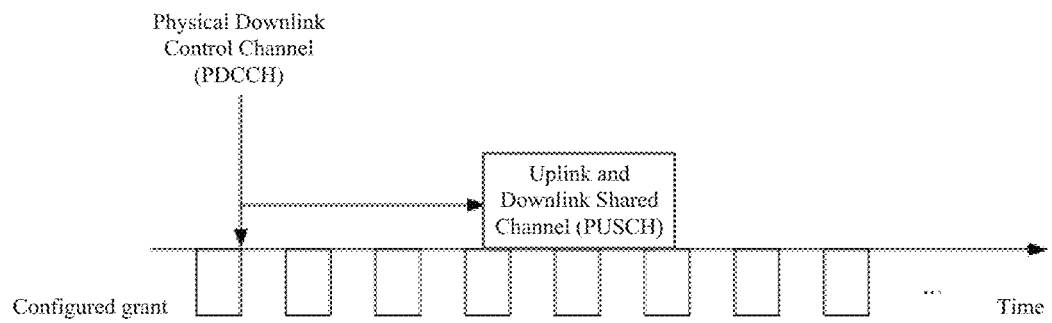
FIG. 1 is a schematic diagram of data transmission when the configured grant resources overlaps or collides with the dynamic grant and scheduled resources.
Figure 2:
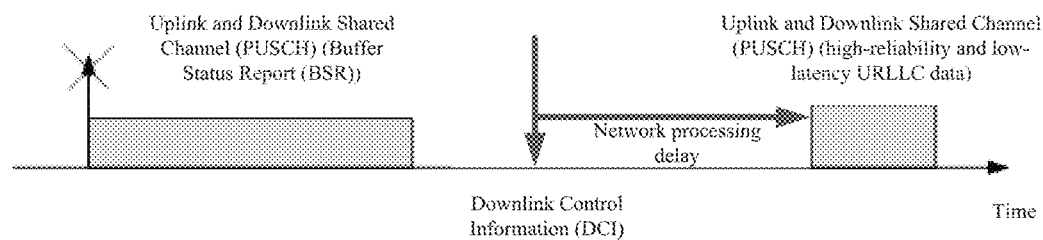
FIG. 2 is a schematic diagram of data transmission when SR transmission resources collide with uplink and downlink shared channel PUSCH resources.
Figure 3:
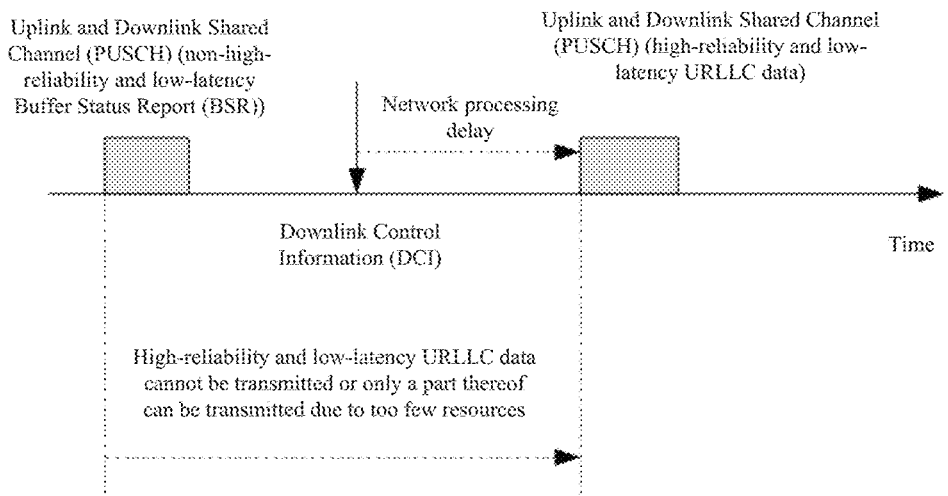
FIG. 3 is a schematic diagram where the MAC CE multiplexing priority problem causes the URLLC data to be delayed.
Figure 4:
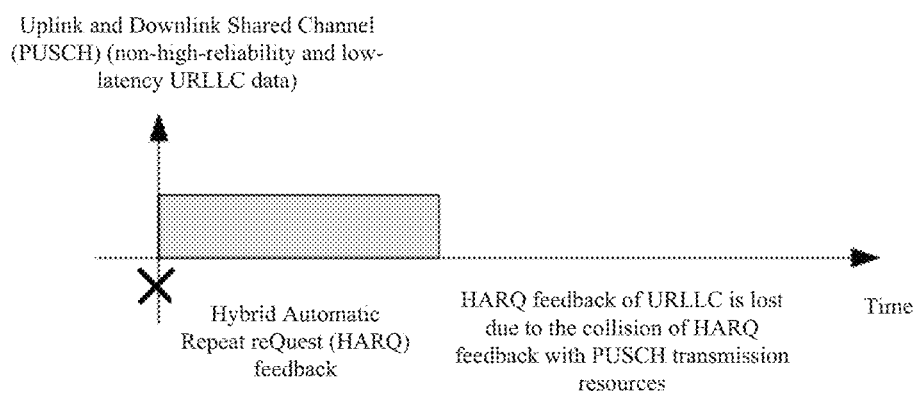
FIG. 4 is a schematic diagram of data transmission when the HARQ feedback of the URLLC data collides with PUSCH resources.

In order to make the objects, technical solutions and advantages of the present application clearer, the present application will be further illustrated below in details with reference to the accompanying figures. Obviously the described embodiments are merely a part of embodiments of the present application but not all embodiments. Based upon embodiments of the present application, all of other embodiments obtained by those ordinary skilled in the art without creative work pertain to the protection scope of the present application.

The application scenarios described in embodiments of the present application are intended to illustrate the technical solutions of embodiments of the present application more clearly, and do not constitute a limitation on the technical solutions provided in embodiments of the present application. As can be known by those ordinary skilled in the art, with the appearance of new application scenarios, the technical solutions provided in embodiments of the present application are also applicable to similar technical problems. Here, in the description of the present application, "multiple" means two or more unless otherwise specified.

Here, the above 5G NR system mainly supports three types of services as follows.
1) enhanced Mobile Broadband (eMBB);
2) massive Machine Type Communications (mMTC);
3) Ultra-Reliable and Low Latency Communications (URLLC).

Here, the URLLC mainly refers to services with high reliability and low latency. The main application scenarios include: industrial automation, smart city, Augmented Reality (AR) or Virtual Reality (VR), etc., the low latency requirement is as low as 0.5 ms, and the packet loss rate at the high reliability is as low as 1E-6.

Currently, when a UE uses the configured grant resources and dynamic grant resources to transmit data, there is a problem that the UE cannot transmit the URLLC data preferentially in the following scenarios:
1) when the configured grant resources collide with the dynamic grant resources, the dynamic grant data is transmit preferentially, so that the pre-configured grant data cannot be transmit, causing the increased delay of the URLLC data;
2) when the SR transmission resources collides with the PUSCH resources, the transmission delay of the URLLC is caused;
3) the MAC CE multiplexing priority problem causes the URLLC data to be delayed in transmitting;

4) when the HARQ feedback collides with the PUSCH resources or the PUSCH resources are not enough, the PUSCH data will be transmit preferentially, thereby increasing the URLLC transmission delay.

In order to solve the problem of delayed transmission of the data similar to the URLLC in the foregoing scenarios, embodiments of the present application provide the methods and devices for data transmission and indicating data transmission.

In order to make the objects, technical solutions and advantages of the present application clearer, the present application will be further illustrated below in details with reference to the accompanying figures. Obviously the described embodiments are merely a part of embodiments of the present application but not all embodiments. Based upon embodiments of the present application, all of other embodiments obtained by those ordinary skilled in the art without creative work pertain to the protection scope of the present application.

In view of the foregoing scenarios, embodiments of the present application will be further described in detail below in combination with the accompanying drawings of the specification.

Figure 5:
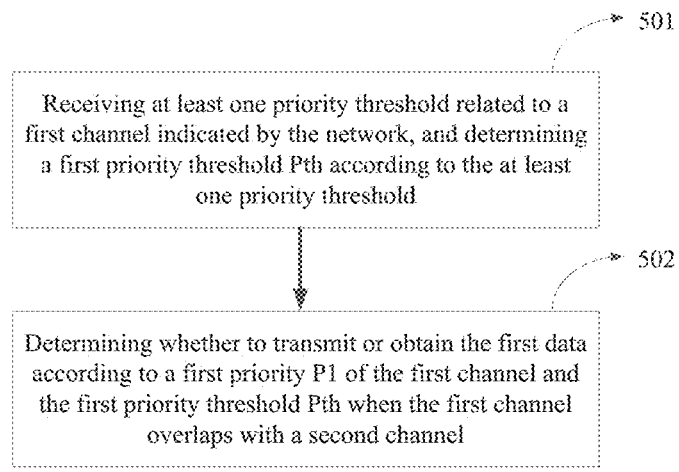
FIG. 5 is a schematic diagram of a data transmission method suitable for a terminal device provided by an embodiment of the present application.

As shown in FIG. 5, embodiments of the present application provide a method for data transmission suitable for a UE, which specifically includes the following steps.

Step 501: receiving at least one priority threshold related to a first channel indicated by the network side, and determining a first priority threshold Pth according to the at least one priority threshold.

In same embodiments, the network side indicates the at least one priority threshold according to any one or more of: a transmission service feature of the terminal device, a channel resource status of a network side, a channel status of a terminal device, the configuration information of a core network.

The first priority threshold Pth is related to the first channel and is used for scenarios where the data on the first channel may be delayed, and different delay scenarios correspond to different first priority thresholds Pth.

Step 502: determining whether to transmit or obtain the first data according to a first priority P1 of the first channel and the first priority threshold Pth, when the first channel overlaps with a second channel. Here, the first channel is used to transmit or obtain the first data, and the second channel is used to transmit or obtain the second data.

The first data and the second data are different data, and the first data is the data with special requirements that needs to be transmitted preferentially.

In the above method, the first priority P1 of the first channel and the first priority threshold Pth are used to determine whether to transmit the first data preferentially, avoiding the phenomenon that the first data with specific requirements is delayed when the first channel for transmitting or obtaining the first data collides with the second channel during the data transmission process, and ensuring that the first data can be transmitted or obtained preferentially.

In same embodiments, the first data is the high-reliability and low-latency data or the feedback of the high-reliability and low-latency data.

In a possible implementation of the step 501, the terminal device receives any one or more of the following priority thresholds indicated by the network side: a priority threshold of a configured grant, a priority threshold of an SR transmission, a priority threshold of an HARQ feedback, a transmission priority threshold of a Media Access Control Control Element (MAC CE).

According to the scenario corresponding to the overlap between the first channel and the second channel and the foregoing priority thresholds, the first priority threshold Pth is determined, and the first priority threshold corresponding to the first channel in the current scenario is determined.

When the first data is the high-reliability and low-latency data or the feedback information of the high-reliability and low-latency data, the first channel transmits or obtains the first data, including any one or more combinations of the following operations:
  use the first channel to transmit or obtain the configured grant data;
  use the first channel to transmit or obtain the SR data;
  use the first channel to receive the HARQ feedback;
  use the uplink grant channel to transmit the high-reliability and low-latency data.

In a possible implementation of the step 502, when the first data is the high-reliability and low-latency data or the feedback information of the high-reliability and low-latency data, the scenario where the first channel overlaps with the second channel may include but not limited to any one or any combination of:
  1) the configured grant resources collide with the dynamic grant resources;
  2) the SR transmission resources collide with the PUSCH resources;
  3) the resources occupied by the HARQ feedback collide with the PUSCH resources, or the PUSCH resources are not enough (the default data transmission method is to transmit the PUSCH data preferentially at this time);
  4) the MAC CE multiplexing priority problem causes the URLLC data to be delayed in transmitting.

In a possible implementation of the step 502, the step of determining whether to transmit or obtain the first data according to the first priority P1 and the first priority threshold Pth includes the following cases.

Case 1: transmit or obtain the first data when P1>Pth, here P1>Pth indicates that the first priority P1 of the first channel is higher than the first priority threshold Pth.

Case 2: transmit or obtain the first data when P1>Pth and P1>P2, here P2 is the maximum value among priorities of all logical channels corresponding to the second data, and P1>P2 indicates that the first priority P1 of the first channel is higher than the highest one of the priorities of all logical channels corresponding to the second data.

Case 3: transmit or obtain the second data when P1>Pth and P1≤P2, here P1≤P2 indicates that the first priority P1 of the first channel is lower than or equal to the highest one of priorities of all logical channels corresponding to the second data.

When the first priority threshold Pth is a priority threshold of a configured grant, the second data is data multiplexed to a dynamic grant.

Figure 6:
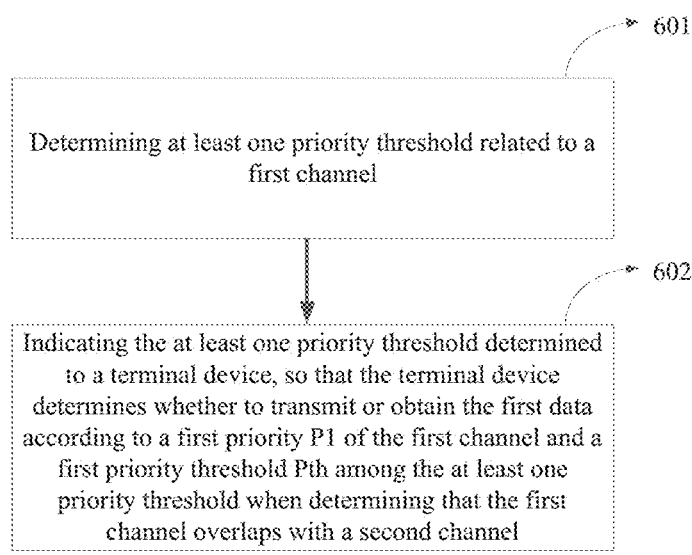
FIG. 6 is a schematic diagram of a data transmission method suitable for the network provided by an embodiment of the present application.

Based on the same inventive concept, as shown in FIG. 6, embodiments of the present application further provide a method for indicating data transmission applicable to the network side, which includes:
  Step 601: determining at least one priority threshold related to a first channel; and
  Step 602: indicating the at least one priority threshold determined to a terminal device, so that the terminal device determines whether to transmit or obtain the first data according to a first priority P1 of the first channel and a first priority threshold Pth among the at least one priority threshold when determining that the first channel overlaps with a second channel;

Here, the first channel is used to transmit or obtain the first data, and the second channel is used to transmit or obtain the second data.

The first data is the high-reliability and low-latency data or the feedback of the high-reliability and low-latency data.

In some embodiments, the network side can, but is not limited to, determine the at least one priority threshold related to the first channel according to any one or more of: a transmission service feature of the terminal device, a channel resource status of the network side, a channel status of the terminal device, the configuration information of a core network.

The first priority threshold Pth is: a priority threshold of a configured grant; or a priority threshold of an SR transmission; or a priority threshold of an HARQ feedback; or a transmission priority threshold of an MAC CE.

Embodiments of the present application provide a method for data transmission, which is suitable for scenarios in which the configured grant resources collide with dynamic grant resources.

In the next-generation NR, the network side may pre-configure some UL resources, to facilitate some services that require high latency (such as Ultra-Reliable and Low Latency Communications (URLLC) services) or services with relatively regular service formats (such as VoIP) to be transmitted on these configured UL resources.

There are currently two scheduling methods for scheduling UL resources: configured grant type 1 and configured grant type 2. The similarity between the two scheduling methods is that the base station will allocate periodic resource locations to the UE in advance, and the UE will transmit data in accordance with the resource locations allocated by the base station.

The difference between the two scheduling methods is as follow.

In the configured grant type 1, the resource locations, the Modulation Coding Scheme (MCS) mode, the size of Radio Block (RB), the number of HARQs and the period of allocating resource locations are configured through the Radio Resource Control (RRC) signaling, and it takes effect after the RRC configuration and does not require the process of physical layer activation and deactivation.

In the configured grant type 2, the resource locations, the number of HARQs and the period of allocating resource locations are configured through the RRC signaling, but the MCS mode and the size of RB will not be configured; and there is a need for the physical layer to transmit the Downlink Control Information (DCI) to perform the activation and deactivation operations on resources, and then the above configuration will takes effect.

Figure 7:
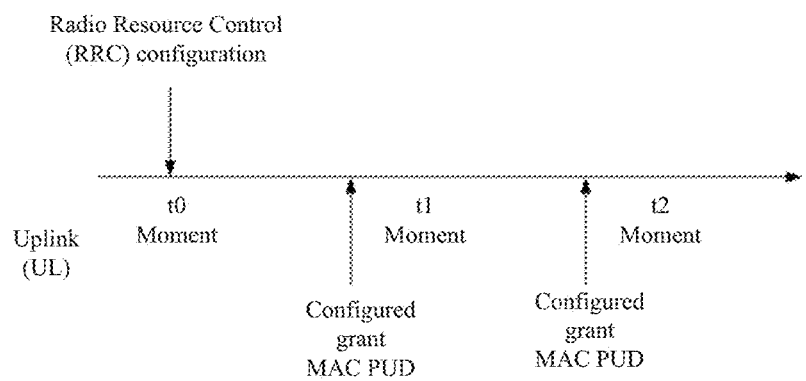
FIG. 7 is a schematic diagram of configured grant of the configured grant type 1.
Figure 8:
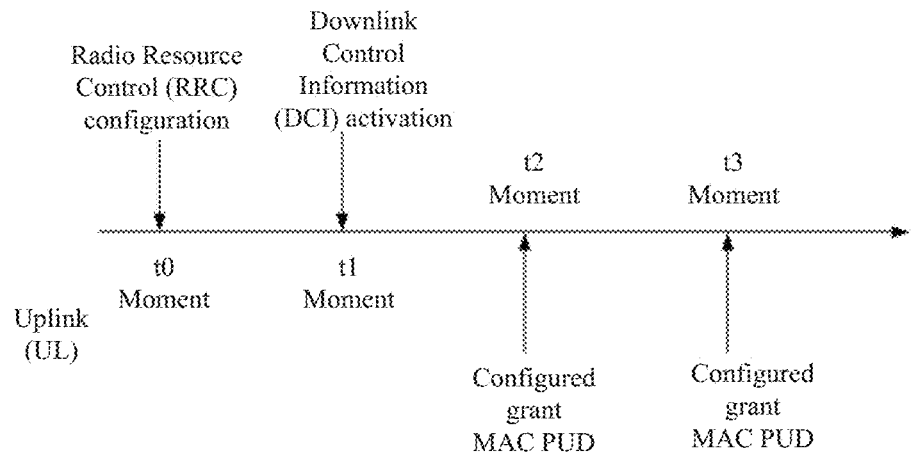
FIG. 8 is a schematic diagram of configured grant of the configured grant type 2.

In the above configured grant types 1 and 2, the data sending processes are as shown in FIG. 7 and FIG. 8 respectively, FIG. 7 shows that the feature of the configured grant type 1 is that the resources can be used after the network side configures the resources through RRC. In FIG. 8, after the network side configures resources through RRC, the network side needs to re-activate the resources before the UE can use the configured grant. The difference between FIG. 7 and FIG. 8 is whether an activation process of the physical layer is required.

In some embodiments, the pre-configured grant resources may overlap or collide with the dynamic grant and scheduled resources. For this scenario, the first channel in this embodiment refers to the configured grant channel multiplexing the URLLC data, and the second channel refers to the logical channel multiplexing the dynamically scheduled data, the first data is the data multiplexed to the configured grant, and the second data is the dynamic grant data.

In some embodiments, the network side configures the corresponding priority threshold of a configured grant (PriorityThreshold_cg) according to the transmission service features of a terminal device, the resource status of a network-side channel, the channel status of the terminal device and the configuration information of the core network, and indicates it to the terminal device; and the terminal device receives the priority threshold of the configured grant indicated by the network side, determines the first priority threshold Pth as the priority threshold of the configured grant in the above conflict scenario, and determines whether to transmit or obtain the first data according to the first priority P1 of the first channel and the first priority threshold Pth.

In some embodiments, the maximum value among the logical channel priorities in the first channel is determined as P1, and the maximum value among the logical channel priorities in the second channel is determined as P2.

When P1>PriorityThreshold_cg, the pre-configured grant URLLC data is transmit; or, when P1≤PriorityThreshold_cg and P1>P2, the pre-configured grant URLLC data is transmit; or, when P1<PriorityThreshold_cg and P1≤P2, the dynamically scheduled data is transmit.

Figure 9:
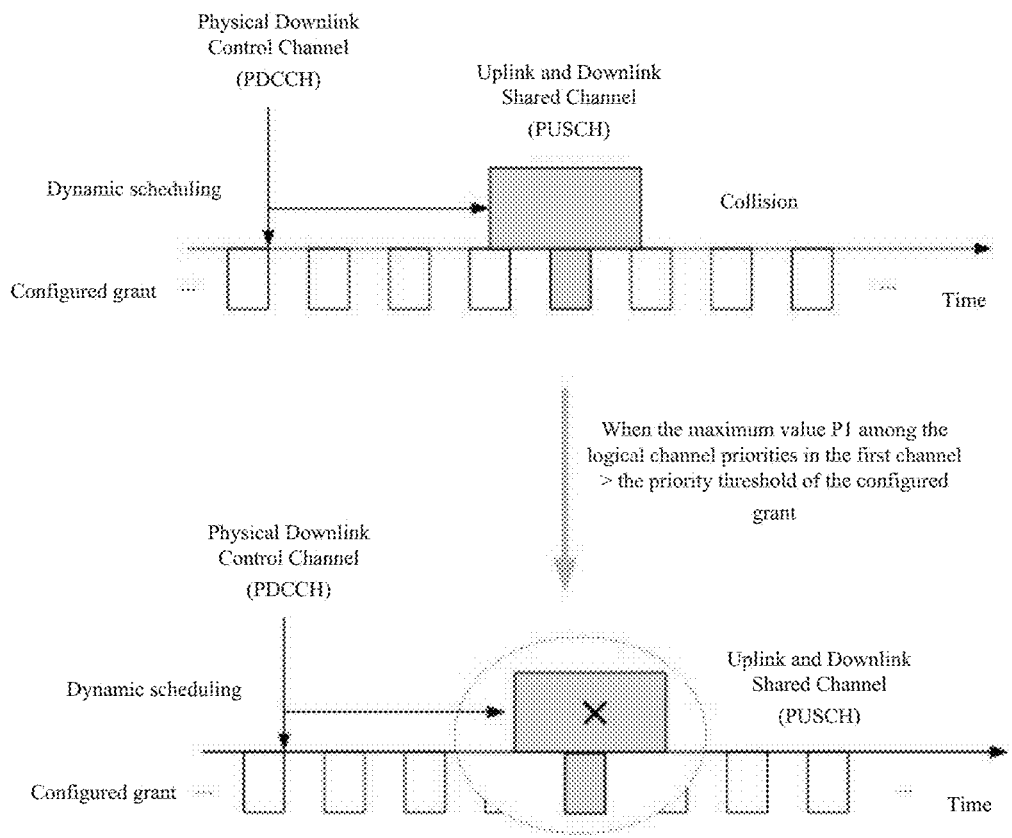
FIG. 9 is an implementation effect diagram in a scenario where the configured grant resources collides with the dynamically grant resources provided by an embodiment of the present application.

When the UE performs the retransmission of the dynamically scheduled data, the above P2 represents the maximum value among the logical channel priorities of the second channel multiplexed to the Transport Block (TB) to perform the retransmission; when the UE performs a new transmission of the dynamically scheduled data, it represents the maximum value among the logical channel priorities in the second channel multiplexed to the dynamic grant. The implementation effect of the foregoing method is as shown in FIG. 9. P1 here refers to the highest one of the logical channel priorities of the configured grant. In FIG. 9, the priority of P1 is greater than PriorityThreshold_cg, so the configured grant is transmitted preferentially, and the dynamically scheduled transmission is stopped here.

Embodiments of present application provide a method for data transmission, which is suitable for scenarios where the SR transmission resources collide with PUSCH resources.

When a UE performs the data transmission, if the UE has no uplink data to be transmitted, the network side does not need to allocate uplink resources for the UE, otherwise a waste of resources will be caused. In order to avoid the unnecessary waste of resources, the UE needs to tell the network side whether UE has uplink data to be transmitted so that the network side can decide whether to allocate uplink resources for the UE. For this reason, the NR provides an uplink SR mechanism.

The UE tells the network side whether uplink resources are needed for Uplink-Shared Channel (UL-SCH) transmission through the SR information, but the UE does not tell the network side the amount of uplink data that needs to be transmit (the above amount of uplink data that needs to be transmitted is reported by BSR). After receiving the SR transmit by the UE, the network side allocates a certain amount of uplink resources to the UE according to the implementation mode of the network side, and usually allocates at least enough resources to send the BSR to the UE.

The network side does not know the time when the UE transmits the uplink data, so the network side needs to detect whether there is SR information reported on the allocated resources.

The MAC entity can be configured with 0, 1 or multiple SR configurations; an SR configuration includes multiple Bandwidth Parts (BWPs) and a series of Physical Uplink Control Channel (PUCCH) resources on the corresponding cell. For a logical channel, only one PUCCH resource can be configured on each BWP.

Each SR configuration described above corresponds to one or more logical channels, and each logical channel can correspond to no or one SR, which are configured by RRC signaling, wherein the SR that triggers the BSR is the pending SR. The UE sends an SR because it has no uplink PUSCH resource. Therefore, the UE can only send the SR on a Physical Uplink Control Channel (PUCCH).

The network side may allocate one dedicated SR resource for each UE to transmit the SR. The resource is periodically, and one SR resource is allocated every fixed number of subframes/slots/symbols.

Figure 10:
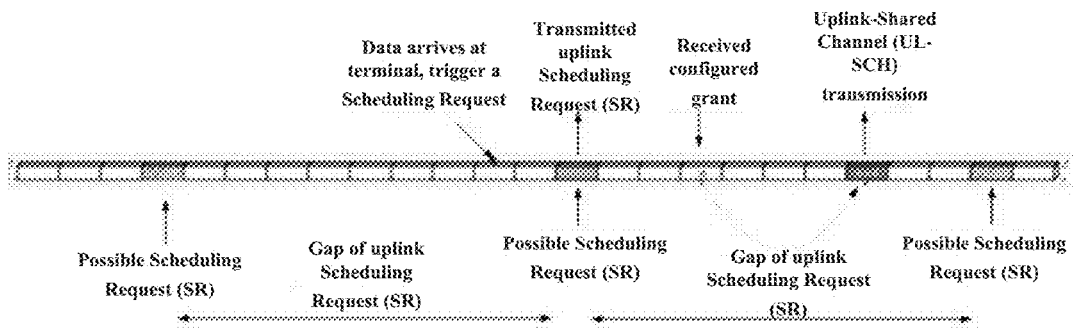
FIG. 10 is a schematic diagram of SR transmission.

FIG. 10 is an example of SR transmission, a UE triggers an SR after the data arrives and sends the SR on the next nearest SR resource. After that, the UE receives the UL grant and sends the data on the PUSCH (UL-SCH) indicated by the UL grant. The above-mentioned data generally refers to a data packet containing BSR.

However, when the SR is transmitted described above, the collision between the SR transmission resources and the PUSCH resources (which may be resources for transmitting the BSR) may occur, thereby causing the SR to be transmitted with a delay.

In some embodiments, the first channel is the logical channel corresponding to the SR configuration of the SR, and the second channel is the uplink authorized PUSCH channel, the first data is the URLLC-type SR, and the second data is the PUSCH data.

In order to solve the above problem, in some embodiments, the network side configures the priority threshold PriorityThreshold_SR of the corresponding SR transmission according to the transmission service features of the terminal device, the channel resource status of the network side and the channel state of the terminal device, and indicates it to the terminal device; and the terminal device receives the transmission priority threshold of the SR indicated by the network side, determines the first priority threshold Pth as the transmission priority threshold of the SR when the above collision scenario occurs, and determines whether to transmit or obtain the SR (first data) according to the first priority P1 of the first channel and the first priority threshold Pth.

In some embodiments, the maximum value among the logical channel priorities in the first channel is recorded as P1, and the maximum value among the logical channel priorities in the second channel is recorded as P2.

When P1>PriorityThreshold_SR, the SR of the URLLC data is sent at the physical layer; or, when P1≤PriorityThreshold_SR1 and P1>P2, the SR of the URLLC data is sent at the physical layer; or, when P1<PriorityThreshold_SR1 and P1≤P2, the PUSCH data is sent.

Figure 11:
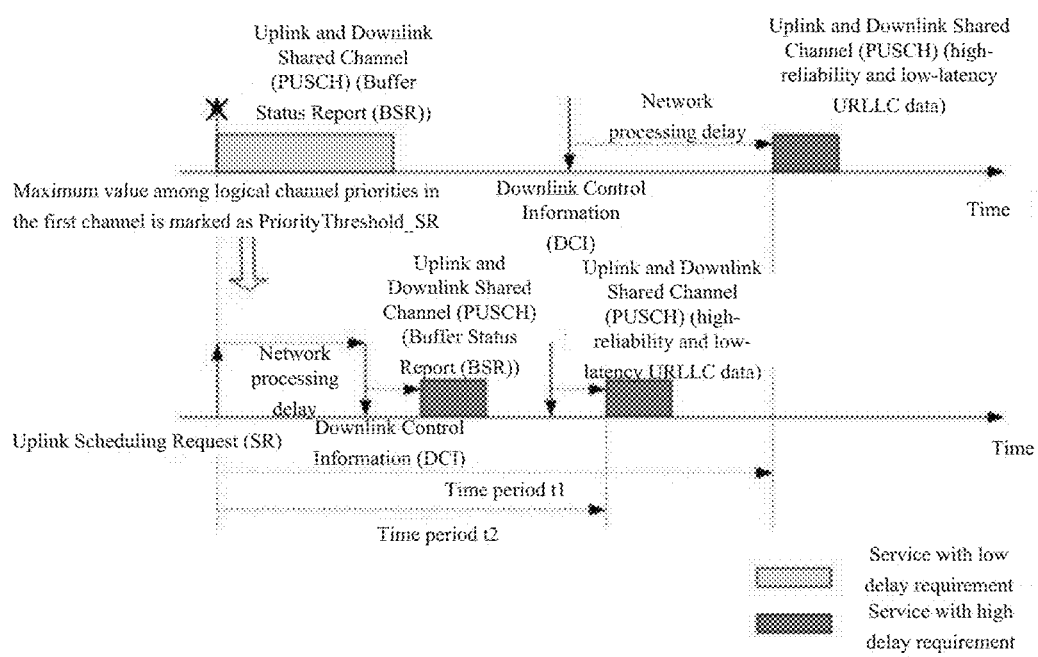
FIG. 11 is a schematic diagram of a method implementation where SR transmission resources collides with PUSCH resources provided by an embodiment of the present application.

FIG. 11 shows a timing diagram of the SR and PUSCH data transmission corresponding to the above data transmission method of this embodiment.

Embodiments of the present application provide a method for data transmission, which is suitable for scenarios where the HARQ feedback collides with PUSCH resources or the PUSCH resources are not enough.

When the terminal device transmits the HARQ feedback and the HARQ feedback collides with PUSCH resources or the PUSCH resources are not enough, the PUSCH data will be sent preferentially, thereby increasing the URLLC transmission delay.

In some embodiments, the first channel is a logical channel corresponding to the transmission or acquisition of the HARQ feedback, and the second channel is a logical channel for uplink grant PUSCH; the first data is the HARQ feedback, and the second data is the PUSCH data.

In order to solve the above problem, in the solution of this embodiment, the network side configures the corresponding priority threshold of the HARQ feedback (PriorityThreshold_HARQ_feedback) according to the transmission service features of the terminal device, the resource status of the network-side channel, the channel status of the terminal device and the configuration information of the core network, and indicates it to the terminal device; and the terminal device receives the priority threshold of the HARQ feedback sent by the network side, determines the first priority threshold Pth as the priority threshold of the HARQ feedback in the above conflict scenario, and determines whether to transmit or obtain the HARQ feedback according to the first priority P1 of the first channel and the first priority threshold Pth.

In some embodiments, the priority corresponding to the current first channel is determined as P1, and the maximum value among the logical channel priorities in the second channel is recorded as P2.

When P1>PriorityThreshold_HARQ_feedback, the HARQ feedback of the URLLC data is sent; or, when P1≤PriorityThreshold_HARQ_feedback and P1>P2, the PUSCH data is sent; or, when P1<PriorityThreshold_HARQ_feedback and P1<P2, the dynamically scheduled data is sent.

In the above method, when the PUSCH data collides with the HARQ feedback of the URLLC data, it is determined whether the HARQ feedback of the URLLC data is transmitted preferentially according to the comparison result of the priority thresholds, so that the HARQ feedback of the URLLC data is transmitted in time.

Embodiments of present application provide a method for data transmission, which is applicable to scenarios where the MAC CE multiplexing priority problem causes the URLLC data to be delayed in sending.

The multiplexing priority order of logical channels at the MAC layer is as follows:
1) C-RNTI MAC CE or data obtained from the UL common control channel;
2) Configured grant and confirmed MAC CE;
3) BSRs other than filling BSRs, such as conventional BSR (regular BSR), periodic BSR;
4) PHR;
5) Data obtained from data channels other than the UL common control channel;
6) Recommended bit rate request MAC CE;
7) Padding BSR.

The priority of the BSR is higher than the priority of any data from logical channels, so the URLLC data will be delayed when the amount of data contained in the BSR is non-URLLC services and when the size of the sent UL grant is not enough to send the URLLC data.

In some embodiments, the first channel is a logical channel corresponding to the uplink grant, and the second channel is a logical channel multiplexed by the MAC CE; the first data is the uplink grant data, and the second data is the data multiplexed by the MAC CE.

In order to solve the above problem, in the solution of this embodiment, the network side configures the corresponding transmission priority threshold of the MAC CE (PriorityThreshold_MACCE) according to the transmission service features of the terminal device, the resource status of the network-side channel, the channel status of the terminal device and the configuration information of the core network, and indicates it to the terminal device; and the terminal device receives the transmission priority threshold of the MAC CE indicated by the network side, determines the first priority threshold Pth as the transmission priority threshold of the MAC CE when the above conflict occurs, and determines whether to transmit or obtain the uplink grant data according to the first priority P1 of the first channel and the first priority threshold Pth.

In some embodiments, the maximum value among the logical channel priorities multiplexed into the first channel is recorded as P1, and the priority corresponding to the second channel multiplexed by the MAC CE is recorded as P2.

When P2>PriorityThreshold_MAC CE, the MAC CE is multiplexed; or, when P2≤PriorityThreshold_MAC CE and P1>P2, the MAC CE is multiplexed preferentially; or, when P2≤PriorityThreshold_MAC CE and P1≤P2, the data on the logical channel of the uplink grant data is multiplexed preferentially.

Figure 12:
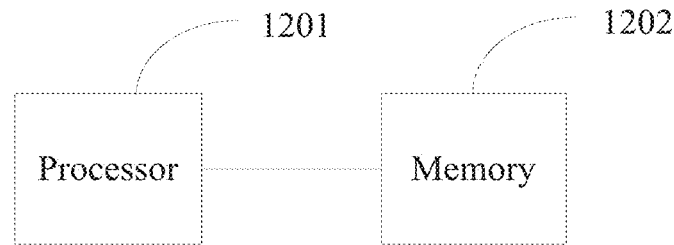
FIG. 12 is a schematic diagram of a terminal device for data transmission provided by an embodiment of the present application.

As shown in FIG. 12, based on the same inventive concept, embodiments of the present application provide a terminal device. The terminal device includes a processor 1201 and a memory 1202, the memory stores computer instructions, and the computer instructions, when executed by the processor 1201, cause the processor 1201 to perform the process of:

receiving at least one priority threshold related to a first channel indicated by the network side, wherein the at least one priority threshold includes a first priority threshold;

determining whether to transmit or obtain the first data according to a first priority P1 of the first channel and the first priority threshold Pth when the first channel overlaps with a second channel;

the first channel is used to transmit or obtain the first data, and the second channel is used to transmit or obtain the second data.

The first data is the high-reliability and low-latency data or the feedback information of the high-reliability and low-latency data.

The priority threshold is indicated by the network side according to any one or more of: a transmission service feature of the terminal device, a channel resource status of the network side, a channel status of the terminal device, the configuration information of a core network.

The first priority threshold is: a priority threshold of a configured grant; or a transmission priority threshold of an SR; or a priority threshold of an HARQ feedback; or a transmission priority threshold of an MAC CE.

The first priority threshold Pth is a priority threshold of a configured grant, the first data is the data multiplexed to the configured grant, and P1 is the highest one of priorities of all logical channels corresponding to the first data.

The first priority threshold Pth is a transmission priority threshold of an SR, the first data is an SR, and P1 is the maximum value among priorities of logical channels that trigger the transmission of the first data.

The first priority threshold Pth is a priority threshold of an HARQ feedback, the first data is a feedback of the downlink data, and P1 is the highest one of priorities of all logical channels corresponding to the downlink data.

The first priority threshold Pth is a transmission priority threshold of an MAC CE, the first data is the uplink data, and P1 is the highest one of priorities of all logical channels corresponding to the first data.

When the first priority threshold Pth is a priority threshold of a configured grant, the second data is data multiplexed to a dynamic grant.

The processor is configured to transmit or obtain the first data when P1>Pth.

The processor is configured to: transmit or obtain the first data when P1>Pth and P1>P2, here P2 is the maximum value among the priorities of all logical channels corresponding to the second data; and transmit or obtain the second data when P1>Pth and P1≤P2.

When the first priority threshold Pth is a priority threshold of a configured grant, the second data is data multiplexed to a dynamic grant.

Figure 13:
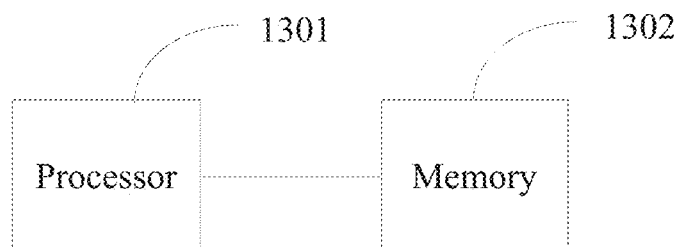
FIG. 13 is a schematic diagram of a network-side device for data transmission provided by an embodiment of the present application.

As shown in FIG. 13, based on the same inventive concept, embodiments of present application further provide a network-side device. The device includes a processor 1301 and a memory 1302, the memory stores program codes, and the program codes, when executed by the processer 1301, cause the processor 1301 to perform the process of:

determining at least one priority threshold related to a first channel;

indicating the at least one priority threshold determined to a terminal device, so that the terminal device determines whether to transmit or obtain the first data according to a first priority P1 of the first channel and a first priority threshold Pth among the at least one priority threshold when determining that the first channel overlaps with a second channel;

here, the first channel is used to transmit or obtain the first data, and the second channel is used to transmit or obtain the second data.

The first data is the high-reliability and low-latency data or the feedback information of the high-reliability and low-latency data.

The processor is configured to determine the at least one priority threshold related to the first channel according to any one or more of: a transmission service feature of a terminal device, a resource status of a network side channel, a channel status of a terminal device, the configuration information of a core network.

The first priority threshold Pth is: a priority threshold of a configured grant; or a priority threshold of an SR transmission; or a priority threshold of an HARQ feedback, or a transmission priority threshold of an MAC CE.

Figure 14:
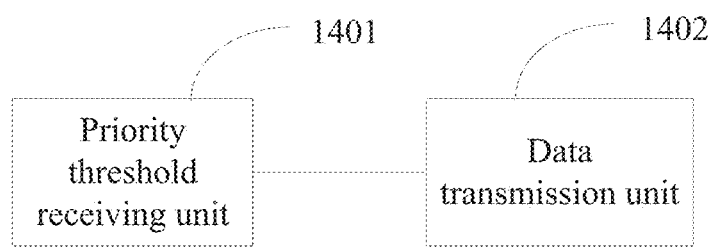
FIG. 14 is an apparatus schematic diagram of a terminal device for data transmission provided by an embodiment of the present application.

As shown in FIG. 14, based on the same inventive concept, embodiments of present application provide a terminal device for data transmission, which includes:

a priority threshold receiving unit 1401 configured to receive at least one priority threshold related to a first channel indicated by the network side, wherein the at least one priority threshold includes a first priority threshold;

a data transmission unit 1402 configured to determine whether to transmit or obtain the first data according to a first priority P1 of the first channel and the first priority threshold Pth when the first channel overlaps with a second channel. Here, the first channel is used to transmit or obtain the first data, and the second channel is used to transmit or obtain the second data.

The first data is the high-reliability and low-latency data or the feedback information of the high-reliability and low-latency data.

The priority threshold is indicated by the network side according to any one or more of: a transmission service feature of a terminal device, a resource status of a network side channel, a channel status of a terminal device, the configuration information of a core network.

The first priority threshold is: a priority threshold of a configured grant; or a transmission priority threshold of an SR; or a priority threshold of an HARQ feedback; or a transmission priority threshold of an MAC CE.

The first priority threshold Pth is a priority threshold of a configured grant, the first data is the data multiplexed to the configured grant, and P1 is the highest one of priorities of all logical channels corresponding to the first data.

The first priority threshold Pth is a transmission priority threshold of an SR, the first data is an SR, and P1 is the highest one of priorities of logical channels that trigger the transmission of the first data.

The first priority threshold Pth is a priority threshold of an HARQ feedback, the first data is a feedback of the downlink data, and Pt is the highest one of priorities of all logical channels corresponding to the downlink data.

The first priority threshold Pth is a transmission priority threshold of an MAC CE, the first data is the uplink data, and P1 is the highest one of priorities of all logical channels corresponding to the first data.

When the first priority threshold Pth is a priority threshold of a configured grant, the second data is data multiplexed to a dynamic grant.

The data transmission unit is configured to transmit or obtain the first data when P1>Pth.

The data transmission unit is configured to: transmit or obtain the first data when P1>Pth and P1>P2, wherein P2 is the highest one of priorities of all logical channels corresponding to the second data; and transmit or obtain the second data when P1>Pth and P1≤P2.

When the first priority threshold Pth is a priority threshold of a configured grant, the second data is data multiplexed to a dynamic grant.

Figure 15:
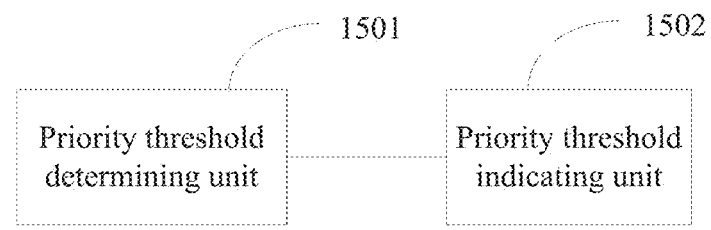
FIG. 15 is an apparatus schematic diagram of a network-side device for data transmission provided by an embodiment of the present application.

As shown in FIG. 15, based on the same inventive concept, embodiments of present application further provide a network-side device for data transmission, which includes:
a priority threshold determining unit 1501 configured to determine at least one priority threshold related to a first channel;
a priority threshold indicating unit 1502 configured to indicate the at least one priority threshold determined to a terminal device, so that the terminal device determines whether to transmit or obtain the first data according to a first priority P1 of the first channel and a first priority threshold Pth among the at least one priority threshold when determining that the first channel overlaps with a second channel.

Here, the first channel is used to transmit or obtain the first data, and the second channel is used to transmit or obtain the second data.

The first data is the high-reliability and low-latency data or the feedback information of the high-reliability and low-latency data.

The priority threshold determining unit is configured to determine the at least one priority threshold related to the first channel according to any one or more of: a transmission service feature of a terminal device, a resource status of a network side channel, a channel status of a terminal device, the configuration information of a core network.

The first priority threshold Pth is: a priority threshold of a configured grant; or a transmission priority threshold of an SR; or a priority threshold of an HARQ feedback; or a transmission priority threshold of an MAC CE.

Embodiments of the present application further provide a non-transitory readable storage medium including program codes. When the above-mentioned program codes run on a computing device, the above-mentioned program codes are configured to cause the above-mentioned computing device to perform the steps of the above-mentioned methods of embodiments of the present application.

The present application has been described above by reference to the block diagrams and/or flow charts showing the methods, devices (systems) and/or computer program products according to embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method for data transmission, applied to a terminal device, comprising:
receiving at least one priority threshold, related to a first channel and indicated by a network, and determining a first priority threshold according to the at least one priority threshold;
when the first channel overlaps with a second channel, determining, according to a first priority of the first channel and the first priority threshold, whether to transmit or obtain first data; wherein:
the first channel is used to transmit or obtain the first data; and
the second channel is used to transmit or obtain second data;
wherein the determining, according to the first priority of the first channel and the first priority threshold, whether to transmit or obtain the first data, comprises:
transmitting or obtaining the first data, when the first priority of the first channel is higher than the first priority threshold, and the first priority of the first channel is higher than a highest one of priorities of all logical channels corresponding to the second data; or transmitting or obtaining the second data, when the first priority of the first channel is higher than the first priority threshold, and the first priority of the first channel is lower than or equal to a highest one of priorities of all logical channels corresponding to the second data.

2. The method of claim 1, wherein the first data is high-reliability and low-latency data or feedback information of high-reliability and low-latency data;
wherein the first priority threshold is:
a priority threshold of a configured grant; or
a transmission priority threshold of an uplink Scheduling Request, SR; or
a priority threshold of a Hybrid Automatic Repeat reQuest, HARQ, feedback; or
a priority threshold of a Media Access Control Control Element, MAC CE, transmission.

3. The method of claim 1, wherein the at least one priority threshold is indicated by one or more of:
a transmission service feature of the terminal device;
a channel resource status of the network;
a channel status of the terminal device;
configuration information of a core network.

4. The method of claim 1, wherein:
the first priority threshold is a priority threshold of a configured grant, the first data is data multiplexed to the configured grant, and the first priority of the first channel is a highest one of priorities of all logical channels corresponding to the first data; or
the first priority threshold is a transmission priority threshold of an SR, the first data is an SR, and the first priority of the first channel is a highest one of priorities of logical channels that trigger the transmission of the first data; or
the first priority threshold is a priority threshold of an HARQ feedback, the first data is a feedback of downlink data, and the first priority of the first channel is a highest one of priorities of all logical channels corresponding to the downlink data; or
the first priority threshold is a transmission priority threshold of an MAC CE, the first data is uplink data, and the first priority of the first channel is a highest one of priorities of all logical channels corresponding to the first data; or
the first priority threshold is a priority threshold of a configured grant; and the second data is data multiplexed to a dynamic grant.

5. A non-transitory computer storage medium storing a computer program thereon, wherein the program, when executed by a processor, implements the method of claim 1.

6. A method for indicating data transmission, applied to a network, comprising:
determining at least one priority threshold related to a first channel; and
indicating the at least one priority threshold to a terminal device, so that when the first channel overlaps with a second channel, the terminal device determines, according to a first priority of the first channel and a first priority threshold among the at least one priority threshold, whether to transmit or obtain first data; wherein:
the first channel is used to transmit or obtain the first data; and
the second channel is used to transmit or obtain second data;
wherein the first priority threshold is determined according to the at least one priority threshold;
wherein the terminal device determines, according to a first priority of the first channel and a first priority threshold among the at least one priority threshold, whether to transmit or obtain first data, further comprises:
transmitting or obtaining the first data, when the first priority of the first channel is higher than the first priority threshold, and the first priority of the first channel is higher than a highest one of priorities of all logical channels corresponding to the second data; or
transmitting or obtaining the second data, when the first priority of the first channel is higher than the first priority threshold, and the first priority of the first channel is lower than or equal to a highest one of priorities of all logical channels corresponding to the second data.

7. The method of claim 6, wherein the first data is high-reliability and low-latency data or feedback information of high-reliability and low-latency data;
wherein the first priority threshold is:
a priority threshold of a configured grant; or
a transmission priority threshold of an uplink Scheduling Request, SR; or
a priority threshold of a Hybrid Automatic Repeat reQuest, HARQ, feedback; or
a transmission priority threshold of a Media Access Control Control Element, MAC CE.

8. The method of claim 6, wherein the at least one priority threshold related to the first channel is determined according to any one or more of:
a transmission service feature of the terminal device;
a channel resource status of the network;
a channel status of the terminal device;
configuration information of a core network.

9. A non-transitory computer storage medium storing a computer program thereon, wherein the program, when executed by a processor, implements the method of claim 6.

10. A terminal device, comprising: a processor and a memory, wherein the memory stores computer instructions, and the computer instructions, when executed by the processor, cause the processor to perform the process of:
receiving at least one priority threshold, related to a first channel and indicated by a network, and determining a first priority threshold according to the at least one priority threshold;
when the first channel overlaps with a second channel, determining, according to a first priority of the first channel and the first priority threshold, whether to transmit or obtain first data; wherein:
the first channel is used to transmit or obtain the first data; and
the second channel is used to transmit or obtain second data;
wherein the processor is configured to:
transmit or obtain the first data, when the first priority of the first channel is higher than the first priority threshold, and the first priority of the first channel is higher than a highest one of priorities of all logical channels corresponding to the second data; or
transmit or obtain the second data, when the first priority of the first channel is higher than the first priority threshold, and the first priority of the first channel is lower than or equal to a highest one of priorities of all logical channels corresponding to the second data.

11. The terminal device of claim 10, wherein the first data is high-reliability and low-latency data or feedback information of high-reliability and low-latency data;

wherein the first priority threshold is:
a priority threshold of a configured grant; or
a transmission priority threshold of an uplink Scheduling Request, SR; or
a priority threshold of a Hybrid Automatic Repeat reQuest, HARQ, feedback; or
a transmission priority threshold of a Media Access Control Control Element, MAC CE.

12. The terminal device of claim 10, wherein the priority threshold is indicated by one or more of:
a transmission service feature of the terminal device;
a channel resource status of the network channel;
a channel status of the terminal device;
configuration information of a core network.

13. The terminal device of claim 10, wherein:
the first priority threshold is a priority threshold of a configured grant, the first data is data multiplexed to the configured grant, and the first priority of the first channel is a highest one of priorities of all logical channels corresponding to the first data; or
the first priority threshold is a transmission priority threshold of an SR, the first data is an SR, and the first priority of the first channel is a highest one of priorities of logical channels that trigger the transmission of the first data; or
the first priority threshold is a priority threshold of an HARQ feedback, the first data is a feedback of downlink data, and the first priority of the first channel is a highest one of priorities of all logical channels corresponding to the downlink data; or
the transmission first priority threshold is a priority threshold of an MAC CE, the first data is uplink data, and the first priority of the first channel is a highest one of priorities of all logical channels corresponding to the first data; or
the first priority threshold is a priority threshold of a configured grant; and the second data is data multiplexed to a dynamic grant.

14. A network-side device, comprising: a processor and a memory, the memory stores program codes, and the program codes, when executed by the processer, cause the processor to perform the process of:
determining at least one priority threshold related to a first channel;
indicating the at least one priority threshold to a terminal device, so that when the first channel overlaps with a second channel, the terminal device determines, according to a first priority of the first channel and a first priority threshold among the at least one priority threshold, whether to transmit or obtain first data;
wherein:
the first channel is used to transmit or obtain the first data; and
the second channel is used to transmit or obtain second data;
wherein the first priority threshold is determined according to the at least one priority threshold;
wherein the terminal device determines, according to a first priority of the first channel and a first priority threshold among the at least one priority threshold, whether to transmit or obtain first data, further comprises:
transmitting or obtaining the first data, when the first priority of the first channel is higher than the first priority threshold, and the first priority of the first channel is higher than a highest one of priorities of all logical channels corresponding to the second data; or
transmitting or obtaining the second data, when the first priority of the first channel is higher than the first priority threshold, and the first priority of the first channel is lower than or equal to a highest one of priorities of all logical channels corresponding to the second data; and
the first priority threshold is related to the first channel and is used for scenarios where data is delayed on the first channel, and different delay scenarios correspond to different first priority thresholds.

15. The network-side device of claim 14, wherein the first data is high-reliability and low-latency data or feedback information of high-reliability and low-latency data;
wherein the first priority threshold is:
a priority threshold of a configured grant; or
a transmission priority threshold of an uplink Scheduling Request, SR; or
a priority threshold of a Hybrid Automatic Repeat reQuest, HARQ, feedback; or
a transmission priority threshold of a Media Access Control Control Element, MAC CE.

16. The network-side device of claim 14, wherein the processor is configured to determine the at least one priority threshold related to the first channel according to any one or more of:
a transmission service feature of the terminal device;
a channel resource status of the network;
a channel status of the terminal device;
configuration information of a core network.

* * * * *